United States Patent
Koh et al.

(10) Patent No.: US 9,257,696 B2
(45) Date of Patent: Feb. 9, 2016

(54) POSITIVE ELECTRODE MIXTURE SLURRY FOR LITHIUM SECONDARY BATTERIES, AND POSITIVE ELECTRODE AND LITHIUM SECONDARY BATTERY THAT USE SAID SLURRY

(75) Inventors: Meiten Koh, Settsu (JP); Hiroyuki Arima, Settsu (JP); Hideo Sakata, Settsu (JP); Hitomi Nakazawa, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 869 days.

(21) Appl. No.: 13/201,127

(22) PCT Filed: Feb. 10, 2010

(86) PCT No.: PCT/JP2010/051954
§ 371 (c)(1),
(2), (4) Date: Aug. 11, 2011

(87) PCT Pub. No.: WO2010/092976
PCT Pub. Date: Aug. 19, 2010

(65) Prior Publication Data
US 2011/0318638 A1    Dec. 29, 2011

(30) Foreign Application Priority Data
Feb. 12, 2009    (JP) ................. 2009-030347

(51) Int. Cl.
| | |
|---|---|
| *H01M 4/131* | (2010.01) |
| *H01M 4/04* | (2006.01) |
| *H01M 4/1391* | (2010.01) |
| *H01M 4/62* | (2006.01) |
| *H01M 4/505* | (2010.01) |
| *H01M 4/525* | (2010.01) |
| *H01M 10/0525* | (2010.01) |

(52) U.S. Cl.
CPC ............ *H01M 4/131* (2013.01); *H01M 4/0404* (2013.01); *H01M 4/1391* (2013.01); *H01M 4/621* (2013.01); *H01M 4/623* (2013.01); *H01M 4/505* (2013.01); *H01M 4/525* (2013.01); *H01M 10/0525* (2013.01); *Y02E 60/122* (2013.01); *Y02T 10/7011* (2013.01)

(58) Field of Classification Search
CPC ..... H01M 4/525; H01M 4/505; H01M 4/623; H01M 4/131; H01M 4/0404; H01M 4/1391; H01M 10/0525; Y02E 60/122
USPC .......... 429/231.1, 231.3, 217, 233; 252/182.1
See application file for complete search history.

(56) References Cited

U.S. PATENT DOCUMENTS

| | | | |
|---|---|---|---|
| 5,246,796 | A | 9/1993 | Nagamine et al. |
| 6,265,107 | B1 | 7/2001 | Shimizu et al. |
| 6,926,992 | B2 * | 8/2005 | Isozaki et al. .................. 429/59 |
| 2006/0204845 | A1 | 9/2006 | Chang et al. |
| 2006/0286457 | A1 | 12/2006 | Sasaki |
| 2009/0233177 | A1 | 9/2009 | Fujita et al. |
| 2009/0301866 | A1 | 12/2009 | Zaghib et al. |

FOREIGN PATENT DOCUMENTS

| | | | |
|---|---|---|---|
| CA | 2535064 | A1 | 8/2007 |
| CN | 1240053 | A | 12/1999 |
| EP | 0964464 | A1 | 12/1999 |
| JP | 04-095363 | A | 3/1992 |
| JP | 04-249859 | A | 9/1992 |
| JP | 08-004007 | | 1/1996 |
| JP | 08-031408 | * | 2/1996 |
| JP | 10-233217 | A | 9/1998 |
| JP | 11-045717 | A | 2/1999 |
| JP | 11-135121 | A | 5/1999 |
| JP | 11-329441 | | 11/1999 |
| JP | 11-329441 | A | 11/1999 |
| JP | 2002-359003 | A | 12/2002 |
| JP | 2007-305495 | A | 11/2007 |
| JP | 2008021644 | A1 | 1/2008 |
| JP | 2009-193805 | * | 8/2009 |
| KR | 1020060094050 | A | 8/2006 |

OTHER PUBLICATIONS

Extended European Search Report for EP Appln. No. 10741253.8; issued Jul. 16, 2013.

* cited by examiner

*Primary Examiner* — Laura Weiner
(74) *Attorney, Agent, or Firm* — Sughrue Mion, PLLC

(57) ABSTRACT

The invention provides a stable positive-electrode mixture slurry that is not subject to gelation, a positive electrode with abundant flexibility, and a lithium secondary battery with excellent battery characteristics. The slurry comprises a positive-electrode active material, a binder, and an organic solvent, the positive-electrode active material is a lithium-containing complex metal oxide represented by Formula: $Li_x M^1_y M^2_{1-y} O_2$ (wherein $0.4 \leq x \leq 1$; $0.3 \leq y \leq 1$; $M^1$ is at least one selected from Ni or Mn; and $M^2$ is at least one selected from Co, Al, or Fe); and the binder comprises a fluorine-containing polymer represented by Composition Formula: $(VDF)_m(TFE)_n(HFP)_l$ (wherein VDF is a structural unit from vinylidene fluoride; TFE is a structural unit from tetrafluoroethylene; HFP is a structural unit from hexafluoropropylene; and $0.45 \leq m \leq 1$; $0 \leq n \leq 0.5$; and $0 \leq l \leq 0.1$, and $m+n+l=1$).

7 Claims, No Drawings

US 9,257,696 B2

POSITIVE ELECTRODE MIXTURE SLURRY FOR LITHIUM SECONDARY BATTERIES, AND POSITIVE ELECTRODE AND LITHIUM SECONDARY BATTERY THAT USE SAID SLURRY

CROSS REFERENCE TO RELATED APPLICATIONS

This application is a National Stage of International Application No. PCT/JP2010/051954 filed Feb. 10, 2010, claiming priority based on Japanese Patent Application No. 2009-030347, filed Feb. 12, 2009, the contents of all of which are incorporated herein by reference in their entirety.

TECHNICAL FIELD

The present invention relates to a highly stable positive electrode mixture slurry for a lithium secondary battery, a positive electrode with abundant flexibility using said slurry, and a lithium secondary battery with improved battery characteristics using the same.

BACKGROUND ART

Lithium secondary batteries have been widely used as power sources for various types of portable electrical and electronic equipment, as batteries for electric automobiles, and the like.

A lithium secondary battery comprises a positive electrode, a negative electrode, a nonaqueous electrolyte, and normally a separator as well. Developmental improvements for each component are under active investigation.

Normally, to fabricate the positive electrode, for example, a slurry of the positive electrode mixture is prepared by dispersing a positive electrode active material together with a binder, and if necessary a conductive material, in an organic solvent, followed by applying the dispersion to a positive electrode current collector, removing the solvent by drying, and then rolling.

Conventionally, polyvinylidene fluoride (PVdF) has been widely used as a binder for the positive electrode in lithium secondary batteries. Patent Document 1, for example, discloses a technique for fabricating an electrode sheet in which a positive electrode mixture is prepared by mixing a lithium-containing oxide such as $LiCoO_2$ as the positive electrode active material and graphite as the conductive material with PVdF, the resulting mixture is dispersed in N-methylpyrrolidone to make a slurry, and the slurry is applied to an aluminum foil positive electrode current collector; a negative electrode mixture is prepared by mixing a carbonaceous material as the negative electrode active material with PVdF, the resulting mixture is dispersed in N-methylpyrrolidone to make a slurry, and the slurry is applied to a copper foil negative electrode current collector; and after each of the obtained collectors has been dried, the collector is subjected to compression molding with a roller press. Recently, in response to the need for higher capacity and voltage there has been a change of the positive electrode active material from $LiCoO_2$ to ones containing nickel and manganese. However, a positive electrode active material that contains nickel or manganese is more basic than $LiCoO_2$, which disadvantageously makes gelation of PVdF more likely to occur.

In addition, PVdF is more likely to swell in an organic solvent for the nonaqueous electrolyte such as propylene carbonate, ethylene carbonate, diethyl carbonate or a mixture thereof used in lithium ion secondary batteries. This is a problem because the adhesion of the PVdF to the metal foil current collector deteriorates with repeated charge-discharge cycles, resulting in an increase in internal resistance and therefore a decrease in battery performance. In addition, an electrode sheet using PVdF as a binder has poor flexibility, and in the step of folding the electrode sheet 180° to fabricate a prismatic cell or the step of tightly rolling up the electrode sheet to fabricate a cylindrical cell, a problem is likely to occur because the electrode mixture peels off the electrode sheet, resulting in a poorer production yield.

In addition, Patent Document 2 discloses the use of a rubbery elastic material having as the main component thereof a fluorinated binary copolymer such as a vinylidene fluoride (VdF)/hexafluoropropylene (HFP) copolymer or VdF/chlorotrifluoroethylene (CTFE) copolymer as a binder to impart adhesiveness to the positive electrode active material in order to counter the expansion and contraction thereof during charging and discharging in a secondary battery with a nonaqueous electrolyte. However, such a copolymer has poorer crystallinity than PVdF and swells as much or more than PVdF in an organic solvent for the nonaqueous electrolyte. Hence, depending on the type of electrolyte, the polymer dissolves away and cannot fulfill its role as a binder. In addition, the polymer is also prone to gelation with a positive electrode active material containing nickel or manganese.

As a similar binder Patent Document 3 discloses the use of a fluorinated copolymer mainly comprising VdF, tetrafluoroethylene (TFE) and HFP in place of PVdF as a binder. The compositional ranges of the copolymer components disclosed in the claims of Patent Document 3 are 0.3-0.9 VdF, 0.03-0.5 HFP, and 0-0.5 TFE in molar ratio, and the total molar ratio of these 3 monomers ranges from 0.80 to 1. Patent Document 3 also points out that PVdF causes problems in the production process because it will only dissolve in specific solvents that are extremely polar, have a high boiling point, and may also be toxic such as the aforementioned N-methylpyrrolidone, dimethylacetamide, dimethylformamide, and methyl sulfoxide. Therefore, for example, when applying an active material using said solvent followed by molding in the process of manufacturing an electrode, the high-boiling point solvent takes too long for drying, and sealed equipment, ventilation systems, and the like must be installed because of the toxicity thereof. Therefore, in Patent Document 3 the aforementioned copolymer that dissolves in a low-cost, low-boiling point, common organic solvent, e.g., a ketone such as methyl ethyl ketone or methyl isobutyl ketone; an ester such as ethyl acetate or butyl acetate; an ether such as a dioxane or tetrahydrofuran; or a mixture thereof is used to solve the above problems. Just as in the case of the aforementioned VdF/HFP binary copolymer and VdF/CTFE binary copolymer, however, basically this VdF/TFE copolymer also swells considerably in an organic solvent for the nonaqueous electrolyte, and therefore problems such as a decline in battery characteristics can occur because during the long-term use of the battery the electrode mixture peels off the current collector and the active material is lost therefrom.

To overcome these problems Patent Document 4 discloses a binder that is soluble in particularly common solvents and does not easily swell in an organic solvent for the electrolyte. The binders disclosed in Patent Document 4 are a fluorine-containing binary copolymer consisting of 50 to 80 mol % of VdF and 20 to 50 mol % of TFE, and a fluorine-containing ternary copolymer consisting of 50 to 80 mol % of VdF, 17 to 50 mol % of TFE, and less than 3 mol % of a different comonomer. Patent Document 4 discloses a VdF/TFE copolymer and a VdF/TFE/HFP copolymer as the VdF/TFE copolymers used in the examples.

At the same time, various developments in the positive electrode active material have proceeded from the standpoint of battery characteristics and safety, the depletion of resources (rare metals), and the like, and most recently a positive electrode active material has appeared that contains nickel or manganese and reduces the content of the rare metal cobalt. However, because such a positive electrode material containing nickel or manganese is more basic, the slurry is prone to gelation.

Furthermore, when a positive electrode mixture slurry is prepared using a positive electrode material that contains nickel or manganese, and a PVdF binder, and then the slurry is applied and dried, the binder and positive electrode material will react as they are heated, even at temperatures of about 100° C. This is considered to be a cause of a loss in positive electrode capacity, hardening of the electrode with resulting cracking, etc.

Patent Document 1: JP H4-249859 A
Patent Document 2: JP H4-95363 A
Patent Document 3: JP H8-4007 B
Patent Document 4: JP H10-233217 A

SUMMARY OF THE INVENTION

Problems to be Solved by the Invention

Meanwhile there are problems because lithium-containing complex oxides that contain nickel or manganese are essentially basic, and although the reason is still unknown, gelation occurs in a positive electrode mixture slurry containing such an oxide with PVdF or a VdF copolymer, and the slurry loses its stability.

An object of the present invention is to provide a stable positive electrode mixture slurry that is not subject to gelation, a positive electrode with abundant flexibility, and a lithium secondary battery with excellent battery characteristics.

Means for Solving the Problems

The inventors conducted further investigations regarding this object, and as a result they found that among VdF copolymers, a VdF/TFE copolymer wherein TFE is copolymerized in a specific quantity with VdF is unexpectedly stable with regard to a basic lithium-containing complex oxide, and that a positive electrode mixture slurry prepared from a mixture thereof is not only homogeneous, but also stable. The inventors also found that a positive electrode that is formed using this positive electrode mixture slurry has excellent flexibility, the positive electrode mixture does not peel off the current collector, and the battery characteristics of a lithium secondary battery are improved thereby.

Such excellent resistance to bases is a property specifically seen in the VdF/TFE copolymer, and it is not found in other VdF copolymers such as VdF/HFP copolymers, VdF/CTFE copolymers, and the like.

Moreover, the inventors also found that the stability of the positive electrode mixture slurry is increased by reducing the water content of an organic solvent used in the preparation of the slurry.

Specifically, the present invention relates to a positive electrode mixture slurry for a lithium secondary battery, the slurry comprising a positive electrode active material (A), a binder (B), and an organic solvent (C), wherein the positive electrode active material (A) is a lithium-containing complex metal oxide represented by Formula (A): $Li_xM^1{}_yM^2{}_{1-y}O_2$
(wherein $0.4 \leq x \leq 1$; $0.3 \leq y \leq 1$; $M^1$ is at least one selected from the group consisting of Ni and Mn; and $M^2$ is at least one selected from the group consisting of Co, Al, and Fe); and the binder (B) comprises a fluorine-containing polymer represented by Composition Formula (B): $(VDF)_m(TFE)_n(HFP)_L$
(wherein VDF is a structural unit from vinylidene fluoride; TFE is a structural unit from tetrafluoroethylene; HFP is a structural unit from hexafluoropropylene; and $0.45 \leq m \leq 1$; $0 \leq n \leq 0.5$; and $0 \leq L \leq 0.1$, and $m+n+L=1$).

Preferably, the binder (B) comprises a fluorine-containing copolymer of Formula (B) wherein $0.50 \leq m \leq 0.90$; $0.10 \leq n \leq 0.50$; and $0 \leq L \leq 0.08$, and $m+n+L=1$, or a fluorine-containing binary copolymer of Formula (B) wherein $0.50 \leq m \leq 0.90$; and $0.10 \leq n \leq 0.50$, and $m+n=1$, or a fluorine-containing copolymer of Formula (B) wherein $0.50 \leq m \leq 0.90$; $0.10 \leq n \leq 0.45$; and $0.01 \leq L \leq 0.05$, and $m+n+L=1$.

The present invention also relates to a positive electrode for a lithium secondary battery obtainable by applying the positive electrode mixture slurry according to the present invention to a positive electrode current collector and drying the applied slurry.

The present invention also relates to a lithium secondary battery comprising the positive electrode according to the present invention, a negative electrode, and a nonaqueous electrolyte.

In addition, the present invention relates to a process for producing a positive electrode mixture slurry for a lithium secondary battery, comprising dispersing:

a positive electrode active material (A) that is a lithium-containing complex metal oxide represented by the above Formula (A); and a binder (B) comprising a fluorine-containing polymer represented by the above Composition Formula (B)

in an organic solvent (C) with a water content of 100 ppm or less, and preferably 30 ppm or less.

As the organic solvent (C), N-methylpyrrolidone is preferred.

In addition, the present invention relates to a positive electrode mixture slurry for a lithium secondary battery obtainable by the production method according to the present invention.

Effect of the Invention

The present invention can provide a homogeneous and stable positive electrode mixture slurry, a positive electrode with excellent flexibility that is formed using said positive electrode mixture slurry, and a lithium secondary battery with excellent battery characteristics produced using said positive electrode mixture.

MODES FOR CARRYING OUT THE INVENTION

The positive electrode mixture slurry for a lithium secondary battery of the present invention comprises a positive electrode active material (A), a binder (B), and an organic solvent (C). Each component is explained in detail below.

(A) Positive Electrode Active Material

The positive electrode active material used in the present invention is a lithium-containing complex metal oxide represented by Formula (A): $Li_xM^1{}_yM^2{}_{1-y}O_2$ (wherein $0.4 \leq x \leq 1$; $0.3 \leq y \leq 1$; $M^1$ is at least one selected from the group consisting of Ni and Mn; and $M^2$ is at least one selected from the group consisting of Co, Al, and Fe.)

More specifically, lithium-containing complex metal oxides represented by the following formulas are preferred.

$LiNi_xCo_yAl_zO_2$      Formula (A1)

(wherein $0.7 \leq x \leq 1$; $0 \leq y \leq 0.3$; $0 \leq z \leq 0.03$; and $0.9 \leq x+y+z \leq 1.1$);

$LiNi_xCo_yMn_zO_2$      Formula (A2)

(wherein $0.3 \leq x \leq 0.6$; $0 \leq y \leq 0.4$; $0.3 \leq z \leq 0.6$; and $0.9 \leq x+y+z \leq 1.1$);

$$Li_xMn_zO_2 \qquad \text{Formula (A3)}$$

(wherein $0.4 \leq x \leq 0.6$; and $0.9 \leq z \leq 1$); and $$LiFe_xCo_yMn_zO_2 \qquad \text{Formula (A4)}$$

(wherein $0.3 \leq x \leq 0.6$; $0.1 \leq y \leq 0.4$; $0.3 \leq z \leq 0.6$; and $0.9 \leq x+y+z \leq 1.1$).

Specific examples of the lithium-containing complex metal oxide represented by Formula (A1) include $LiNi_{0.8}Co_{0.2}O_2$, $LiNi_{0.7}Co_{0.3}O_2$, $LiNi_{0.82}Co_{0.15}Al_{0.03}O_2$, $LiNi_{0.7}Co_{0.2}Al_{0.1}O_2$, $LiNi_{0.85}Co_{0.1}Al_{0.5}O_2$, etc., and among these $LiNi_{0.82}Co_{0.15}Al_{0.03}O_2$ (NCA) is preferred Specific examples of the lithium-containing complex metal oxide represented by Formula (A2) include $LiNi_{0.5}Mn_{0.5}O_2$, $LiNi_{0.75}Mn_{0.25}O_2$, $LiNi_{0.25}Mn_{0.75}O_2$, $LiNi_{1/3}Co_{1/3}Mn_{1/3}O_2$, $LiNi_{0.4}Co_{0.2}Mn_{0.4}O_2$, $LiNi_{0.3}Co_{0.5}Mn_{0.2}O_2$, etc., and among these $LiNi_{1/3}Co_{1/3}Mn_{1/3}O_2$ (NCM) is preferred.

Specific examples of the lithium-containing complex metal oxide represented by Formula (A3) include $Li_{0.5}MnO_2$ (manganese spinel), $LiMnO_2$, etc.

Specific examples of the lithium-containing complex metal oxide represented by Formula (A4) include $LiFe_{1/3}Co_{1/3}Mn_{1/3}O_2$, $Li_{0.5}Fe_{1/3}Co_{1/3}Mn_{1/3}O_2$, $LiFe_{0.4}Co_{0.3}Mn_{0.3}O_2$, $Li_{0.5}Fe_{0.4}Co_{0.3}Mn_{0.3}O_2$, etc.

In addition, $LiNiO_2$, $LiMn_2O_4$, etc., can be used.

(B) Binder

The binder (B) used in the present invention comprises a fluorine-containing polymer represented by Composition Formula (B): $(VDF)_m(TFE)_n(HFP)_L$ (wherein VDF is a structural unit from vinylidene fluoride; TFE is a structural unit from tetrafluoroethylene; HFP is a structural unit from hexafluoropropylene; and $0.45 \leq m \leq 1$; $0 \leq n \leq 0.5$; $0 \leq L \leq 0.1$, and $m+n+L=1$). Furthermore, the VDF, TFE, and HFP structural units can be joined in any order, and may be joined randomly.

Among these, as the fluorine-containing polymer, a VdF/TFE fluorine-containing copolymer of Formula (B) wherein $0.50 \leq m \leq 0.90$; $0.10 \leq n \leq 0.50$; and $0 \leq L \leq 0.08$, and $m+n+L=1$ is preferred from the standpoint of good alkaline resistance and flexibility.

Within this range, a VdF/TFE fluorine-containing binary copolymer of Formula (B) wherein $0.50 \leq m \leq 0.90$; and $0.10 \leq n \leq 0.50$, and $m+n=1$ is particularly preferred from the standpoint of good alkaline resistance and flexibility. Additionally, from the standpoint of good resistance to bases and good flexibility, a copolymer wherein n (the TFE component) is 0.10 to 0.40 is preferred, and one wherein n is 0.15 to 0.40 is particularly preferred.

Moreover, a VdF/TFE/HFP fluorine-containing ternary copolymer wherein $0.50 \leq m \leq 0.90$; $0.10 \leq n \leq 0.45$; and $0.01 \leq L \leq 0.05$, and $m+n+L=1$ is preferred from the standpoint of good alkaline resistance and flexibility. Additionally, from the standpoint of good resistance to bases and good flexibility, a copolymer wherein $0.60 \leq m \leq 0.90$; $0.09 \leq n \leq 0.45$; and $0.01 \leq L \leq 0.04$ is preferred, and a copolymer wherein $0.60 \leq m \leq 0.70$; $0.30 \leq n \leq 0.40$; and $0.02 \leq L \leq 0.04$ is further preferred.

Regardless of whether the copolymer is binary or ternary, if the TFE content is much greater than the abovementioned range, the copolymer is difficult to dissolve in an organic solvent, and conversely, if the TFE content is much smaller than the abovementioned range, the resistance to bases and the flexibility are prone to decrease, and the effect of the present invention may not be sufficiently manifested.

The molecular weight of the VdF/TFE copolymer is preferably 10,000 to 500,000 polystyrene equivalents when the number-average molecular weight is measured by GPC (gel permeation chromatography). If the molecular weight is very small as less than 10,000, film-forming may become impossible, and if the molecular weight is greater than 500,000, the electrode mixture becomes very thixotropic, and application thereof to the electrode current collector tends to become difficult. Moreover, a relatively high molecular weight is preferred to improve the cycle characteristics and, for example, a ternary copolymer with a molecular weight of 150,000 to 500,000 is preferred from that standpoint.

The VdF/TFE copolymer used in the present invention can be polymerized by a publicly known polymerization method, and among these, radical copolymerization is preferred as the primary method. More specifically, as long as polymerization progresses by radicalization, the means thereof is not particularly limited herein, and polymerization can be initiated, for example, by an organic or inorganic radical polymerization initiator, heat, light, ionizing radiation, and the like. The form of polymerization used can be solution polymerization, bulk polymerization, suspension polymerization, emulsion polymerization, and the like.

The VdF/TFE copolymer has excellent resistance to bases, it is soluble in a nitrogen-containing organic solvent (such as N-methylpyrrolidone, dimethylformamide, dimethylacetamide and the like that used as a solvent for PVdF) as well as in commonly used, low-boiling point, general organic solvents, gelation thereof does not occur when it is mixed with the positive electrode active material, it can impart flexibility to the positive electrode, and it swells very little in a nonaqueous electrolyte.

For the binder (B) in the present invention a VdF/TFE copolymer represented by abovementioned Composition Formula (B) can be used alone, but in order to further improve adhesion the binder can also contain a resin such as PVdF, polymethacrylate, polymethylmethacrylate, polyacrylonitrile, polyimide, polyamide, polyamide-imide, or polycarbonate. Preferably the content of these resins in the binder is approximately 20 wt % or less.

In the present invention the term PVdF refers to a resin wherein VdF units constitute at least 95 mol % thereof. However, resins denoted as PVdF also include (1) those with a terminal functional group resulting from an initiator or a chain transfer agent, (2) those without a terminal functional group, and (3) those containing a small amount of a modification monomer, and the like. Even if such modifications have been effected, however, the basic characteristics as PVdF are retained within the abovementioned range.

(C) Organic Solvent

The positive electrode mixture slurry of the present invention is obtainable by mixing and dispersing the positive electrode active material (A) and binder (B), as well as another electrode material such as a conductive material described below, in an organic solvent.

Examples of the organic solvent (C) used to prepare the positive electrode mixture slurry of the present invention include nitrogen-containing organic solvents such as N-methylpyrrolidone, dimethylformamide, and dimethylacetamide; and also low-boiling point, common organic solvents including ketone solvents such as acetone, methyl ethyl ketone, cyclohexanone, and methyl isobutyl ketone; ester solvents such as ethyl acetate and butyl acetate; ether solvents such as tetrahydrofuran and dioxanes; and mixtures of the above. Among these, N-methylpyrrolidone is particularly preferred from the standpoint of excellent stability of the slurry and uniformity of coating thickness during application.

Furthermore, the water content of the organic solvent (C) is important for producing a stable positive electrode mixture slurry. In other words, if the water content is set to 100 ppm or less (or even preferably to 30 ppm or less), the slurry is less likely to be basic due to the positive electrode active material, and gelation can be suppressed.

(D) Other Electrode Materials

Other electrode materials can be incorporated into in the present invention as needed in a range such that the effect of the present invention is not impaired.

One example of another electrode material is a conductive material. Examples of the conductive material include types of carbon black such as acetylene black, Ketjen black, and the like, and carbon materials such as graphite.

The method of preparing the positive electrode mixture slurry of the present invention generally involves a method comprising preparing a solution by dissolving the binder (B) in the organic solvent (C), and then mixing and dispersing the positive electrode active material (A) and conductive material (D) in the solution. Alternatively, the slurry can be prepared, for example, by mixing the powdered binder (B), positive electrode active material (A) and conductive material (D), and then adding the organic solvent (C).

The content ratio of the binder (B) in the positive electrode mixture slurry of the present invention is 0.1 to 20 wt %, preferably 1 to 10 wt % of the solids (the positive electrode active material (A), binder (B), conductive material (D), and the like). The content of the positive electrode active material (A) is 80 to 98 wt %, preferably 90 to 97 wt % of the solids. When a conductive material (D) is used, the content of the conductive material (D) is 1 to 20 wt %, preferably 2 to 10 wt %, of the solids. The solids concentration in the slurry is preferably 40 to 70 wt % from the standpoint of good workability and coating properties, and good stability of the slurry.

The positive electrode mixture slurry of the present invention is a stable, homogeneous fluid that does not undergo gelation, and a positive electrode can be fabricated by applying said slurry to a positive electrode current collector, followed by drying, rolling, and cutting to a predetermined size. Conventional fabrication methods and conditions can be employed for preparing the positive electrode.

Examples of the positive electrode current collector to which the positive electrode mixture slurry is applied include types of aluminum foil such as aluminum foil, etched aluminum foil, aluminum foil coated with a conductive paste, and the like.

Because a VdF/TFE copolymer that is very flexible and does not undergo gelation is used as the binder (B), the positive electrode of the present invention has good adhesion between the positive electrode mixture and the current collector, and even if it is worked into a wound (spiral) shape or a folded shape, cracking and delamination of the positive electrode mixture layer do not occur, and battery characteristics do not drop off significantly even after repeated charge-discharge cycles because the swelling is less likely to occur in a nonaqueous electrolyte.

The present invention also relates to a lithium secondary battery comprising the positive electrode of the present invention, a negative electrode, and a nonaqueous electrolyte.

A negative electrode can be fabricated using publicly known materials and methods; for example, a negative electrode mixture using a negative electrode active material and a negative electrode binder is prepared, and this is applied or adhered to a negative electrode current collector such as copper foil. A carbonaceous material that can be doped/de-doped with lithium, etc., is used as the negative electrode active material. Examples include conductive polymers such as polyacene, polypyrrole, etc., and coke, polymeric carbon, and carbon fiber. In addition, pyrolytic carbon, a type of coke (petroleum coke, pitch coke, coal coke, etc.), carbon black (e.g., acetylene black), glassy carbon, a calcined organic polymer (organic polymer calcined at 500° C. or more under a flow of inert gas or in a vacuum) or the like is preferred because of the high energy density per unit volume.

A solution prepared by dissolving a publicly known electrolyte salt in a publicly known organic solvent for dissolving an electrolyte can be used as the nonaqueous electrolyte.

The organic solvent for dissolving an electrolyte is not particularly limited herein, and one or more types of the following can be used: publicly known hydrocarbon solvents such as propylene carbonate, ethylene carbonate, butylene carbonate, γ-butyrolactone, 1,2-dimethoxyethane, 1,2-diethoxyethane, dimethyl carbonate, and diethyl carbonate; and fluorine-containing solvents such as fluoroethylene carbonate, fluoroether and a fluorinated carbonate.

Examples of the electrolyte salt include $LiClO_4$, $LiAsF_6$, $LiBF_4$, $LiPF_6$, $LiN(SO_2CF_3)_2$, and $LiN(SO_2C_2F_5)_2$. From the standpoint of good cycle characteristics $LiPF_6$, $LiBF_4$, $LiN(SO_2CF_3)_2$, $LiN(SO_2C_2F_5)_2$, and combinations thereof are particularly preferred.

The electrolyte salt concentration must be 0.8 mol/L or greater, and further preferably 1.0 mol/L or greater. The upper limit of concentration depends on the organic solvent used for dissolving the electrolyte salt, but typically is 1.5 mol/L.

The lithium secondary battery of the present invention can be fabricated by housing these components in a battery casing and sealing the casing. Also, a separator may be placed between the positive and negative electrodes.

EXAMPLES

Next the present invention is described in greater detail through examples, but is by no means limited thereto.

First, the method of preparing the positive electrode mixture slurry, method of fabricating the positive electrode, and method of fabricating the lithium secondary battery (laminated cell) used in the examples and comparative examples below will be described.

(Preparation of Positive Electrode Mixture Slurry)

The desired electrode materials are weighed out so that the mass ratio of the positive electrode active material (A):the binder (B):the conductive material (D) is 95:5:5. The binder (B) is dissolved in N-methylpyrrolidone (NMP) to a concentration of 10 wt %, and then predetermined amounts of the positive electrode active material (A) and conductive material (D) are added to the solution of binder in NMP and thoroughly mixed with a stirrer. Then NMP is added incrementally with stirring until the solids concentration reaches 50 wt %, whereby the positive electrode mixture slurry is prepared.

(Fabrication of Positive Electrode)

The prepared positive electrode mixture slurry is filtered through a nickel mesh sieve (200 meshes) to make the solid particle size uniform. After filtration, the positive electrode mixture slurry is subjected to a vacuum degassing process. After the positive electrode mixture slurry is degassed, it is applied to a 22 μm thick aluminum foil, which is a current collector plate, using an applicator (such that the mass of the dry positive electrode coating will be 18 mg/cm$^2$). After application the NMP is completely evaporated by drying with a forced-air dryer or hot plate at 100 to 120° C. to fabricate a strip-shaped positive electrode.

(Fabrication of Lithium Secondary Battery (Laminated Cell))

Styrene butadiene rubber dispersed in distilled water is added to artificial graphite powder (MAG-D, Hitachi Chemical Co., Ltd.) to make 6 wt % of the solid rubber, and mixed with a disperser to form a slurry. This is applied uniformly to a negative electrode current collector (10 μm thick copper foil) and dried to form a negative electrode mixture layer. The resulting product is compression molded using a roller press, cut, and dried. A lead is then welded thereto to fabricate a strip-shaped negative electrode.

The strip-shaped positive electrode is cut to 40 mm×72 mm (with a 10 mm×10 mm positive electrode terminal), the strip-shaped negative electrode is cut to 42 mm×74 mm (with a 10 mm×10 mm negative electrode terminal), and a lead is welded to each terminal. Moreover, a 20 μm thick microporous polyethylene film is cut to a size of 78 mm×46 mm to form a separator. The separator is disposed between the positive and negative electrodes. This assembly is placed in an aluminum laminated casing. Next, 2 mL of an electrolyte (prepared by dissolving $LiPF_6$ in a 3:7 v/v mixture of ethylene carbonate (EC) and ethyl methyl carbonate (EMC) solvents to a concentration of 1 mol/L) is introduced into one casing and sealed to fabricate a laminated cell with a capacity of 72 mAh.

Example 1

Stability of Positive Electrode Mixture Slurry and Effect of Water Content

Positive electrode mixture slurries were prepared according to the method described above using $LiNi_{0.82}Co_{0.15}Al_{0.03}O_2$ (Toda Kogyo Corp.) as the positive electrode active material (A), three types of the binder (B) [PVdF (KF1120, Kureha Corp.); VdF/TFE binary copolymer (B1) (VdF/TFE=80/20 by mol %); and VdF/TFE/HFP ternary copolymer (B2) (VdF/TFE/HFP=65/32.5/2.5 by mol %)], and three types of NMP with different water contents (water content: 30 ppm, 100 ppm, 300 ppm) as the organic solvent (C) to make 3×3 types of slurries. Next, the viscosity (unit: mPa·s) of the resulting positive electrode mixture slurries was measured. The results are shown in Table 1.
(Measurement of Viscosity)

The positive electrode mixture slurry was placed in a sample bottle and stirred with a rotor at room temperature 25° C. The viscosity was measured with an HBDV-1 Prime (Brookfield Engineering) viscometer.

TABLE 1

| | Viscosity (mPa * s) Water content in NMP (ppm) | | |
|---|---|---|---|
| | 30 | 100 | 300 |
| PVdF | | | |
| Immediately after prep | 640 | 640 | 640 |
| 8 h after prep | 680 | 1800 | 2600 |
| 24 h after prep | 840 | 2800 | Gelled |
| VdF/TFE | | | |
| Immediately after prep | 520 | 520 | 520 |
| 8 h after prep | 540 | 550 | 560 |
| 24 h after prep | 530 | 540 | 540 |
| VdF/TFE/HFP | | | |
| Immediately after prep | 660 | 660 | 660 |
| 8 h after prep | 670 | 640 | 630 |
| 24 h after prep | 650 | 620 | 560 |

From the results in Table 1 it is clear that NMP with a lower water content leads to less change in viscosity (less gelation), and a copolymer comprising TFE leads to less change in viscosity (less gelation) over time.

Comparative Example 1

Positive electrode mixture slurries were prepared in the same manner as Example 1 except $LiCoO_2$ (Nippon Chemical Industrial Co., Ltd.) was used as the positive electrode active material (A). When the viscosity was measured, the viscosity did not change in any of the slurries (no gelation), and the slurries were stable.

From the results of Example 1 and Comparative Example 1 it is clear that when a lithium-containing complex oxide that contains nickel is used as the positive electrode active material, the change in viscosity differs considerably depending on the binder and water content in comparison with cases wherein $LiCoO_2$ is used, and the lithium-containing complex oxide that contains nickel exhibits unique behavior.

Comparative Examples 2 and 3

Positive electrode mixture slurries were prepared in the same manner as Example 1 except that a chlorotrifluoroethylene (CTFE)/VdF copolymer (CTFE/VdF=30/70 by mol %) (Comparative Example 2) and a VdF/HFP copolymer (VdF/HFP=88/12 by mol %) (Comparative Example 3) were used as the binder (B). When the viscosity was measured, all slurries had gelled after 8 hours.

Example 2

Positive electrode mixture slurries were prepared according to the method described above using two types of the positive electrode active material (A) [$LiNi_{0.82}Co_{0.15}Al_{0.03}O_2$ (Toda Kogyo Corp.) and $LiNi_{1/3}Co_{1/3}Mn_{1/3}O_2$ (Nippon Chemical Industrial Co., Ltd.)], three types of the binder (B) [PVdF (KF1120, Kureha Corp.); VdF/TFE binary copolymer (B1) (VdF/TFE=80/20 by mol %); and VdF/TFE/HFP ternary copolymer (B2) (VdF/TFE/HFP=65/32.5/2.5 by mol %)], and NMP with a water content of 30 ppm as the organic solvent (C) to make 2×3 types of slurries.

After stirring for 1 hour, positive electrodes were fabricated by the method described above, and the density of each was measured. The results are shown in Table 2.

Measurement of Viscosity

The positive electrode was passed twice through a roll press with a 75 μm gap at 70° C., and then passed through twice after the gap was reduced to 35 μm. The surface area, film thickness, and weight of the positive electrode were measured, and the density (g/cm³) was calculated.

TABLE 2

| | Density (g/cm³) | |
|---|---|---|
| | $LiNi_{0.82}Co_{0.15}Al_{0.03}O_2$ | $LiNi_{1/3}Co_{1/3}Mn_{1/3}O_2$ |
| PVdF | 2.85 | 2.80 |
| VdF/TFE | 3.05 | 3.04 |
| VdF/TFE/HFP | 3.06 | 3.05 |

From the results in Table 2 it is clear that a copolymer comprising TFE is likely to lead to a higher density than PVdF because it is highly flexible as a binder.

Example 3

The positive electrodes prepared in Example 2 were cut (3 cm long and 6 cm wide), folded 180°, and then spread out and examined visually for cracks in the positive electrode. The results are shown in Table 3.

TABLE 3

| | Presence of cracks | |
|---|---|---|
| | $LiNi_{0.82}Co_{0.15}Al_{0.03}O_2$ | $LiNi_{1/3}Co_{1/3}Mn_{1/3}O_2$ |
| PVdF | Yes | Yes |
| VdF/TFE | No | No |
| VdF/TFE/HFP | No | No |

From the results in Table 3 it is clear that cracking of the positive electrode is suppressed with a copolymer comprising TFE with higher flexibility and alkaline resistance than PVdF.

Example 4

Investigation of Battery Characteristics

Lithium secondary batteries (laminated cells) were fabricated by the method described above using the positive electrodes fabricated in Example 2. The rate characteristic and cycle characteristic of these lithium secondary batteries were investigated as described below. The results are shown in Table 4.

(Rate Characteristic)

The battery is charged at 1.0 C up to 4.2 V until the charge current reaches 1/10 C, and then discharged at a current equivalent to 0.2 C until 3.0 V is reached, and the discharge capacity is determined. Then, the battery is charged at 1.0 C up to 4.2 V until the charge current reaches 1/10 C, and then discharged at a current equivalent to 2 C until 3.0 V is reached, and the discharge capacity is determined. The rate characteristic is determined from the ratio of the discharge capacity at 2 C to that at 0.2 C by inserting those values into the following formula.

Rate characteristic (%)=Discharge capacity (mAh) at 2 C/Discharge capacity (mAh) at 0.2 C×100

(Cycle Characteristic)

For the cycle characteristic, a charge-discharge cycle at the above charge-discharge conditions (charging at 1.0 C up to 4.2 V until the charge current reaches 1/10 C, and then discharging at a current equivalent to 1 C until 3.0 V is reached) is designated as one cycle, and the discharge capacity is measured after the initial cycle and after 100 cycles. The cycle characteristic is represented by a capacity retention, a value calculated from the following formula.

Capacity retention (%)=Discharge capacity (mAh) after 100 cycles/Discharge capacity (mAh) after 1 cycle×100

TABLE 4

| | $LiNi_{0.82}Co_{0.15}Al_{0.03}O_2$ | $LiNi_{1/3}Co_{1/3}Mn_{1/3}O_2$ |
|---|---|---|
| Rate characteristic | | |
| PVdF | 57 | 58 |
| VdF/TFE | 62 | 62 |
| VdF/TFE/HFP | 63 | 61 |
| Cycle characteristic | | |
| PVdF | 95 | 94 |
| VdF/TFE | 96 | 96 |
| VdF/TFE/HFP | 97 | 95 |

From the results in Table 4 it is clear that a copolymer comprising TFE leads to slightly better rate and cycle characteristics. Thus, a copolymer comprising TFE has better properties as a binder.

Example 5

Positive electrode mixture slurries using 3 types of binders [PVdF; VdF/TFE binary copolymer (B1) (VdF/TFE=80/20 by mol %); and VdF/TFE/HFP ternary copolymer (B2) (VdF/TFE/HFP=65/32.5/2.5 by mol %)] were prepared in the same manner as Example 1 except that the organic solvent was changed to butyl acetate with a water content of approximately 50 ppm.

No slurry could be prepared when PVdF was used as the binder because it did not dissolve in the butyl acetate. On the other hand, when VdF/TFE binary copolymer (B1) and VdF/TFE/HFP ternary copolymer (B2) were used as the binder, both copolymers (B1) and (B2) dissolved in the butyl acetate and homogeneous slurries could be prepared therefrom. Moreover, the slurry viscosity was unchanged even after 24 hours.

Example 6

Positive electrode mixture slurries using 3 types of binders [PVdF; VdF/TFE binary copolymer (B1) (VdF/TFE=80/20 by mol %); and VdF/TFE/HFP ternary copolymer (B2) (VdF/TFE/HFP=65/32.5/2.5 by mol %)] were prepared in the same manner as Example 1 except that the organic solvent was changed to cyclohexanone with a water content of approximately 50 ppm.

No slurry could be prepared when PVdF was used as the binder because it did not dissolve in the cyclohexanone. On the other hand, when VdF/TFE binary copolymer (B1) and VdF/TFE/HFP ternary copolymer (B2) were used as the binder, both copolymers (B1) and (B2) dissolved in the cyclohexanone and homogeneous slurries could be prepared therefrom. Moreover, the slurry viscosity was unchanged even after 24 hours.

Example 7

Positive electrode mixture slurries were prepared according to the method of Example 1 described above, but using two types of the positive electrode active material (A) [$Li_2Mn_2O_4$ and $Li_2Ni_{1.5}Mn_{0.5}O_4$], two types of the binder (B) [PVdF (KF1120, Kureha Corp.); and VdF/TFE/HFP ternary copolymer (B2) (VdF/TFE/HFP=65/32.5/2.5 by mol %)], and NMP with a water content of 30 ppm as the organic solvent (C) to make two types of slurries with each positive electrode active material.

Positive electrodes were fabricated from these slurries in the same manner as Example 1, and the density and presence or absence of cracks were investigated following the procedures of Examples 2 and 3. The results are shown in Table 5 (density) and Table 6 (cracking).

TABLE 5

| | Density (g/cm³) | |
| --- | --- | --- |
| | $Li_2Mn_2O_4$ | $Li_2Ni_{1.5}Mn_{0.5}O_4$ |
| PVdF | 2.78 | 2.75 |
| B2 | 3.01 | 2.98 |

TABLE 6

| | Presence of cracks | |
| --- | --- | --- |
| | $Li_2Mn_2O_4$ | $Li_2Ni_{1.5}Mn_{0.5}O_4$ |
| PVdF | Yes | Yes |
| B2 | No | No |

From the results in Tables 5 and 6 it is clear that the density is greater and cracking is lower with TFE/VdF/HFP copolymer (B2) than with PVdF.

In addition, the cycle characteristic (capacity retention (%)) of the positive electrodes obtained therefrom was measured using the same procedure as in Example 4. The results are shown in Table 7. It is to be noted that the maximum charging voltage was set to 4.9 V when the positive electrode active material was $Li_2Ni_{1.5}Mn_{0.5}O_4$.

TABLE 7

| | Cycle characteristic (%) | |
| --- | --- | --- |
| | $Li_2Mn_2O_4$ | $Li_2Ni_{1.5}Mn_{0.5}O_4$ |
| PVdF | 92 | 93 |
| B2 | 96 | 96 |

From the results in Table 7 it is clear that the cycle characteristic is better with TFE/VdF/HFP copolymer (B2) than with PVdF.

Example 8

Positive electrode mixture slurries were prepared according to the method described in Example 1, but using four types of the positive electrode active material (A) [$LiNi_{0.82}Co_{0.15}Al_{0.03}O_2$ (Toda Kogyo Corp.); $LiNi_{1/3}Co_{1/3}Mn_{1/3}O_2$ (Nippon Chemical Industrial Co., Ltd.); $Li_2Mn_2O_4$; and $Li_2Ni_{1.5}Mn_{0.5}O_4$], three types of the binder (B) [PVdF (KF1120, Kureha Corp.); VdF/TFE binary copolymer (B1) (VdF/TFE=80/20 by mol %); and VdF/TFE/HFP ternary copolymer (B2) (VdF/TFE/HFP=65/32.5/2.5 by mol %)], and NMP with a water content of 30 ppm as the organic solvent (C) to make three types of slurries with each positive electrode active material. In this process the mass ratio of A/B was 8/2.

The resulting slurry was applied to a PET film, and after heating for 15 min at 100 C the slurry coating layer was peeled off the PET film and used for testing. Such coating layers were immersed in NMP for 10 minutes and the behavior of each layer (the ability to redisperse) was examined by visual observation. The results are shown in Table 8.

TABLE 8

| | $LiNi_{0.82}Co_{0.15}Al_{0.03}O_2$ | $LiNi_{1/3}Co_{1/3}Mn_{1/3}O_2$ | $Li_2Mn_2O_4$ | $Li_2Ni_{1.5}Mn_{0.5}O_4$ |
| --- | --- | --- | --- | --- |
| PVdF | not redispersed | not redispersed | not redispersed | not redispersed |
| B1 | redispersed | redispersed | redispersed | redispersed |
| B2 | redispersed | redispersed | redispersed | redispersed |

As shown in Table 8, because PVdF had reacted and degenerated, it no longer dissolved (could not redisperse) in NMP when the peeled layer was immersed in NMP. As a result, the shape of the layer was maintained.

On the other hand, because neither binder B1 nor B2 had degenerated, the binders dissolved and thus redispersed in NMP when the peeled layers were immersed in NMP. As a result, the layer shape was not maintained.

Example 9

Laminated cells were fabricated using the positive electrode mixture slurries produced in Example 8 by the same procedure as in Example 4, and the discharge capacity after 3 cycles of the cells was compared in the same manner except that the charge current and discharge current were each set at 0.2 C. The results are shown in Table 9. For the evaluation, the discharge capacity with PVdF was assigned an index value of 100.

TABLE 9

| | $LiNi_{0.82}Co_{0.15}Al_{0.03}O_2$ | $LiNi_{1/3}Co_{1/3}Mn_{1/3}O_2$ | $Li_2Mn_2O_4$ | $Li_2Ni_{1.5}Mn_{0.5}O_4$ |
| --- | --- | --- | --- | --- |
| PVdF | 100 | 100 | 100 | 100 |
| B1 | 103 | 103 | 104 | 104 |
| B2 | 107 | 106 | 104 | 105 |

From the results in Table 9 it is clear that because binders B1 and B2 do not react with the positive electrode, the positive electrode discharge capacity is greater than with PVdF.

Example 10

A slurry preparation step (stirring with a rotor for 12 h at 60 rpm) was performed according to the method described in Example 1 except that (B3) [VdF/TFE binary copolymer (VdF/TFE=90/10 by mol %)]; (B4) [VdF/TFE binary copolymer (VdF/TFE=44/55 by mol %) (for comparison)]; (B5)

[VdF/TFE/HFP ternary copolymer (VdF/TFE/HFP=53/43.5/3.5 by mol %); (B6) [VdF/TFE/HFP ternary copolymer (VdF/TFE/HFP=50/42/8 by mol %), or (B7) [VdF/TFE/HFP ternary copolymer (VdF/TFE/HFP=77/6/17 by mol %) (for comparison)] was used as the binder polymer, $LiNi_{0.82}Co_{0.15}Al_{0.03}O_2$ (Toda Kogyo Corp.) was used as the positive electrode active material, and NMP with a water content of 30 ppm was used as the organic solvent (C). Then a visual examination for the presence or absence of gelation was carried out.

The results showed that no gelation occurred with binders (B3) and (B5)-(B6), and homogeneous slurries were formed thereby. However, binder (B4) with a TFE content greater than 50 mol % was not soluble in NMP, and gelation occurred with binder (B7) which had an HFP content greater than 10 mol %.

The invention claimed is:

1. A positive electrode mixture slurry for a lithium secondary battery, the slurry comprising a positive electrode active material (A), a binder (B), and an organic solvent (C), wherein the positive electrode active material (A) is a lithium-containing complex metal oxide represented by:

$LiNi_xCo_yMn_zO_2$  Formula (A2)

wherein $1/3 \leq x \leq 0.4$; $0.2 \leq y \leq 1/3$; $1/3 \leq z \leq 0.4$ and $0.9 \leq x+y+z \leq 1.1$; and the binder (B) comprises a fluorine-containing polymer represented by Composition Formula (B): $(VDF)_m(TFE)_n(HFP)_L$ wherein VDF is a structural unit from vinylidene fluoride; TFE is a structural unit from tetrafluoroethylene; HFP is a structural unit from hexafluoropropylene; and $0.50 \leq m \leq 0.90$; $0.10 \leq n \leq 0.50$; and $0 \leq L \leq 0.08$, and $m+n+L=1$.

2. The positive electrode mixture slurry according to claim 1, wherein the binder (B) comprises a fluorine-containing copolymer of Formula (B) wherein $0.50 \leq m \leq 0.90$; $0.10 \leq n \leq 0.45$; and $0.01 \leq L \leq 0.05$, and $m+n+L=1$.

3. A positive electrode for a lithium secondary battery obtainable by applying the positive electrode mixture slurry according to claim 1 to a positive electrode current collector and drying the applied slurry.

4. A lithium secondary battery comprising the positive electrode according to claim 3, a negative electrode, and a nonaqueous electrolyte.

5. A method for producing a positive electrode mixture slurry for a lithium secondary battery, comprising dispersing:

a positive electrode active material (A) that is a lithium-containing complex metal oxide represented by:

$LiNi_xCo_yMn_zO_2$  Formula (A2)

wherein $1/3 \leq x \leq 0.4$; $0.2 \leq y \leq 1/3$; $1/3 \leq z \leq 0.4$; and $0.9 \leq x+y+z \leq 1.1$; and a binder (B) comprising a fluorine-containing polymer represented by Composition Formula (B): $(VDF)_m(TFE)_n(HFP)_L$, wherein VDF is a structural unit from vinylidene fluoride; TFE is a structural unit from tetrafluoroethylene; HFP is a structural unit from hexafluoropropylene; and $0.50 \leq m \leq 0.90$; $0.10 \leq n \leq 0.50$; and $0 \leq L \leq 0.08$, and $m+n+L=1$, in an organic solvent (C).

6. The production method according to claim 5, wherein the organic solvent (C) is N-methylpyrrolidone.

7. A positive electrode mixture slurry for a lithium secondary battery obtainable by the production method according to claim 5.

* * * * *